H. L. HEATHCOTE.
TEMPERATURE DETERMINING DEVICE.
APPLICATION FILED JUNE 13, 1914.
1,234,333.
Patented July 24, 1917.
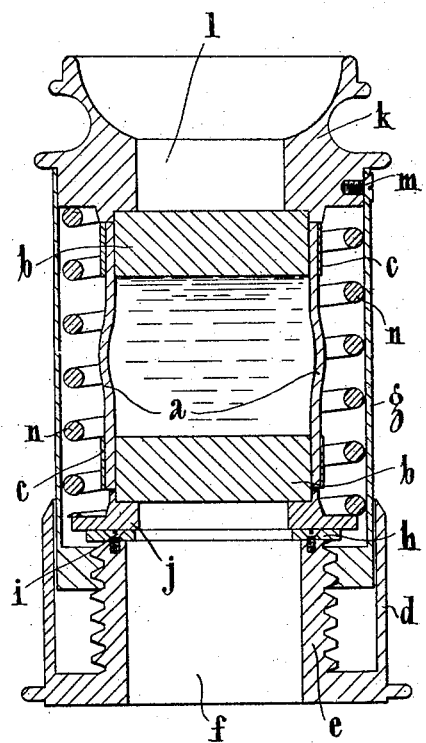
WITNESSES
E. M. Hamilton
B. L. Bishop
INVENTOR
Henry L. Heathcote.
BY
Spear, Middleton, Donaldson & Spear
ATTORNEYS

UNITED STATES PATENT OFFICE.

HENRY LEONARD HEATHCOTE, OF COVENTRY, ENGLAND, ASSIGNOR TO RUDGE-WHITWORTH LIMITED, OF COVENTRY, ENGLAND.

TEMPERATURE-DETERMINING DEVICE.

1,234,333.  Specification of Letters Patent.  Patented July 24, 1917.

Application filed June 13, 1914. Serial No. 844,962.

*To all whom it may concern:*

Be it known that I, HENRY LEONARD HEATHCOTE, a subject of the King of Great Britain and Ireland, residing at Rudge Works, Crow Lane, Coventry, in the county of Warwick, England, have invented certain new and useful Improvements in and Relating to Temperature-Determining Devices, of which the following is a specification.

This invention relates to devices for determining by ocular means the temperature of objects which may be difficult of access, or to which it may be otherwise inconvenient to apply other methods of temperature measurement.

It has already been proposed to use for the determination of the temperature of bodies heated to a red or white heat transparent receptacles containing colored liquids through which the object may be viewed, the temperature being determined by the appearance of the article or substance as seen through different thicknesses of the film or screen of liquid.

For varying the thickness of liquid film a series of containing troughs or dishes one within the other and relatively adjustable were proposed, but to allow of the displacement of liquid consequent upon the relative movement of the sides of the receptacles the upper surface was necessarily open and although an oil seal was suggested to prevent evaporation from the open surface and the wetted surfaces exposed such devices were inconvenient to operate and could not be constructed in a readily portable form.

Other means were suggested, comprising a cell with extensible or camera-like sides, but difficulties arose in the case of camera-like arrangements in accommodating the changes of volume accompanying movement of the walls during adjustment, and in the case of other extensible devices having sliding parts, these exposed wetted surfaces by adjustment and thus led to loss of liquid by evaporation.

For these reasons no apparatus of this kind has been found commercially practicable.

The object of the present invention is to overcome the foregoing disadvantages and to provide a readily portable and easily operated device for obtaining an accurate determination of the temperature under consideration.

The invention consists in a temperature-determining device in which a colored liquid or the like, through a variable thickness of which the heated object is viewed to ascertain its temperature, is retained between the transparent walls of a sealed containing vessel or cell having an elastic portion which allows the capacity of the vessel to remain constant notwithstanding the changes in form accompanying the variations of thickness.

The invention further consists in a device of the foregoing type in which the containing vessel is inclosed by telescoping cylindrical members having screw thread adjusting means and spring means for taking up slack between the threaded parts.

The invention further consists in forming the telescoping cylindrical members so that they are in co-axial screw thread engagement, and may be relatively rotated for effecting adjustment.

The invention also consists in an improved temperature determining device as hereinafter described.

The invention may be carried into effect in one manner as illustrated by way of example in the accompanying drawing, which shows to an enlarged scale one form of the device and in which a cylindrical india-rubber or similar elastic receptacle, *a*, is filled with a suitable liquid of the type hereinbefore referred to, the receptacle being fitted with transparent end walls, *b*, for inclosing the liquid, and being preferably filled at a slight pressure so that the rubber sides are initially bulged outward, as shown, and will be pressed farther in the outward direction during adjustment of the instrument in working. The end walls, *b*, may be held in position by retaining straps, *c*, on the outside of the rubber or in any other suitable manner.

It is essential that the containing receptacle, cell or the like is composed of materials which will practically be inert in order to avoid any chemical action on the liquid by the containing walls or any products liable to be set free therefrom. For this purpose rubber and glass have been found convenient as they provide the further properties of elasticity and transparency required. Other materials having like characteristics may, however, be employed if desirable.

A cylindrical member, d, formed with a deep annular recess and a central boss, e, which is screw threaded upon its outer surface is provided with a central opening, f, forming the observation aperture. Telescoping within the annular recess is a second cylindrical member, g, which is hollow and provided with an inturned collar suitably threaded to screw upon the boss e, of the first member. The two members form a casing for the liquid cell and are retained in connection with one another by a flange, h, fastened by screws, i, upon the end of the boss, e, and overlapping the inturned collar of the second cylindrical member, g. Within the second cylindrical member, g, and resting upon the flange, h, is a loose disk, j, provided with an opening corresponding to the observation aperture and also having a recess for accommodating one transparent end, b, of the liquid containing cell. Fastened in the other end of this second cylindrical member, g, there is an eye-piece, k, provided with an observation aperture, l, and also having a suitable recess for accommodating the other transparent end, b, of the liquid containing cell. This eye-piece, k, is held in position in the second cylindrical member by screws, m, or some equivalent means, and a spiral spring, n, within the member, g, is compressed between the eye-piece, k, and the loose disk, j, and thus operates to take up any slack between the engaging screw threads of the two cylindrical members.

Upon the part of the second cylindrical member, g, which telescopes within the part, d, of the first member, a suitable axially divided scale may be marked which may be read in conjunction with suitable circumferential markings upon the edge of the part d of the first cylindrical member in order to obtain an accurate determination of the relative position of the two members and consequently of the thickness of the film of liquid through which the object is observed. The corresponding temperature may then be easily ascertained.

In operation the heated object is viewed through the instrument and one cylindrical member is rotated relative to the other until the object viewed is visibly colored and may be clearly located through the instrument. A temperature reading is then effected by rotating one member in the opposite direction till the object ceases to appear visibly colored, when the temperature may be ascertained from the scales already described. Various colored liquids may be employed, but it is desirable to choose a solution transmitting an excess of the red rays.

If preferred the device may be constructed in a binocular form, in which case the screw thread adjusting means may be separated from the cylindrical telescoping members and provided in some suitable position where it will operate the two devices conjointly. In such circumstances suitable scales may be provided in connection with the screw thread adjusting means by which the temperature may be ascertained as previously described.

Having now described my invention what I claim as new and desire to secure by Letters Patent is:—

1. A temperature-determining device containing a colored liquid or the like, through a variable thickness of which the heated object is viewed to ascertain its temperature, comprising a sealed containing vessel having transparent walls and an elastic portion which allows the capacity of the vessel to remain constant notwithstanding the changes in form accompanying the variations of thickness, substantially as described.

2. An optical temperature-determining device comprising a transparent and deformable sealed liquid containing vessel, a pair of telescoping cylindrical members to manipulate said vessel for observation therethrough, screw thread adjusting means which control the telescoping of said members and spring means for taking up slack between the threaded parts.

3. An optical temperature-determining device comprising a deformable transparent substance and two cylindrical members having complementary co-axial screw threads and adapted upon relative rotation to adjust the uniform thickness of a strata of said substance through which an object is viewed.

4. In combination in a temperature determining device, a sealed elastic vessel, colored fluid therein, means for viewing objects through said fluid and means for varying the depth of fluid through which said objects are viewed.

5. In combination in a temperature determining device a sealed elastic vessel, parallel transparent portions upon opposite sides thereof, a casing for said vessel and means for varying the length of said casing to adjust the distance between said transparent portions while maintaining their parallelism.

6. In combination in a temperature determining device a sealed elastic vessel, parallel transparent portions upon opposite sides thereof, an adjustable length casing for said vessel, and screw threads for adjusting said casing whereby the distance between said transparent portions is varied while their parallelism is maintained.

7. In combination in a temperature determining device, an elastic tubular member, a transparent stopper entering and firmly fastened in each end thereof to retain fluid therein, an adjustable length casing for said member, screw threads for adjusting said casing whereby the average distance between said transparent stoppers is varied, and spring means for taking up slack in said screw threads.

8. In combination in a temperature determining device a rubber hollow cylindrical member, a glass or like disk rigidly fastened in each end thereof to form a fluid tight vessel affording a constant capacity during variation of its dimensions and means for varying the length of said cylindrical member to alter the distance between said glass disks.

9. In combination in a temperature determining device a rubber hollow cylindrical member, a glass or like disk rigidly fastened in each end thereof to form a fluid tight vessel affording a constant capacity during variation of its axial length, an adjustable length casing for said vessel, and screw threads for adjusting said casing whereby the axial length is altered to vary the distance between said glass disks.

In testimony whereof, I affix my signature in presence of two witnesses.

HENRY LEONARD HEATHCOTE.

Witnesses:
WILLIAM GABRIEL BLATCH,
BERTRAM H. MATTHEWS.

Copies of this patent may be obtained for five cents each, by addressing the "Commissioner of Patents, Washington, D. C."